US010125324B2

(12) United States Patent
Papavassiliou et al.

(10) Patent No.: US 10,125,324 B2
(45) Date of Patent: Nov. 13, 2018

(54) INTEGRATED SYSTEM FOR BITUMEN PARTIAL UPGRADING

(71) Applicants: Vasilis Papavassiliou, Williamsville, NY (US); Gregory J. Panuccio, Amherst, NY (US)

(72) Inventors: Vasilis Papavassiliou, Williamsville, NY (US); Gregory J. Panuccio, Amherst, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 192 days.

(21) Appl. No.: 14/974,933

(22) Filed: Dec. 18, 2015

(65) Prior Publication Data

US 2017/0175004 A1    Jun. 22, 2017

(51) Int. Cl.
*C10G 9/42* (2006.01)
*C10G 9/38* (2006.01)
*C10G 9/00* (2006.01)

(52) U.S. Cl.
CPC ............... *C10G 9/42* (2013.01); *C10G 9/002* (2013.01); *C10G 9/38* (2013.01)

(58) Field of Classification Search
CPC ............. C10G 9/42; C10G 9/002; C10G 9/38
USPC ........................................ 422/187
See application file for complete search history.

(56) References Cited

U.S. PATENT DOCUMENTS

| | | | | |
|---|---|---|---|---|
| 2,039,981 | A * | 5/1936 | Rembert | C09C 1/48 196/127 |
| 4,331,532 | A * | 5/1982 | Bose | C10G 1/047 208/391 |
| 4,362,274 | A * | 12/1982 | Davis | F23D 11/101 239/419.3 |
| 4,847,371 | A * | 7/1989 | Schara | C08B 30/14 426/578 |
| 5,217,363 | A * | 6/1993 | Brais | F23D 14/22 239/401 |
| 5,266,024 | A | 11/1993 | Anderson | |
| 5,724,901 | A * | 3/1998 | Guy | C03B 3/026 110/104 B |
| 6,244,860 | B1 * | 6/2001 | Gross | C01B 33/26 431/187 |
| 6,360,677 | B1 * | 3/2002 | Robillard | F23D 11/101 110/260 |
| 6,450,108 | B2 | 9/2002 | Bool, III et al. | |
| 6,565,010 | B2 | 5/2003 | Anderson et al. | |
| 6,565,019 | B2 | 5/2003 | Dallmeyer et al. | |
| 6,852,215 | B2 | 2/2005 | Wen et al. | |
| 6,923,385 | B2 * | 8/2005 | Koponen | B05B 7/061 239/422 |
| 6,989,091 | B2 | 1/2006 | Jorgensen | |
| 7,229,483 | B2 | 1/2007 | Lewis | |
| 7,618,597 | B2 * | 11/2009 | Duyvesteyn | B01F 5/0256 261/115 |

(Continued)

FOREIGN PATENT DOCUMENTS

CA    2708048 A1    1/2011
CA    2897455 A1    7/2014

*Primary Examiner* — Huy Tram Nguyen
(74) *Attorney, Agent, or Firm* — Iurie A. Schwartz (57) ABSTRACT

The present invention relates to decreasing the amount of diluent needed to convert a heavy oil to a bitumen product that can be transported by pipeline. More specifically, the invention relates to a method and apparatus for partially upgrading heavy oil into a lower viscosity bitumen product.

3 Claims, 6 Drawing Sheets

(56) References Cited

U.S. PATENT DOCUMENTS

| | | | |
|---|---|---|---|
| 7,947,165 B2 | 5/2011 | Berkowitz et al. | |
| 2003/0127226 A1* | 7/2003 | Heins | C02F 1/04 |
| | | | 166/303 |
| 2008/0184952 A1* | 8/2008 | Athans | C10L 1/06 |
| | | | 123/1 A |
| 2010/0059411 A1* | 3/2010 | Satchell, Jr. | C10G 31/06 |
| | | | 208/41 |
| 2010/0122641 A1* | 5/2010 | Molaro | B61D 5/00 |
| | | | 105/358 |
| 2010/0148122 A1* | 6/2010 | Breton | C10J 3/54 |
| | | | 252/373 |
| 2011/0017642 A1 | 1/2011 | Duyvesteyn | |
| 2012/0017493 A1* | 1/2012 | Traynor | C10L 1/02 |
| | | | 44/388 |
| 2013/0105362 A1* | 5/2013 | Salazar | C10G 57/00 |
| | | | 208/88 |

* cited by examiner

INTEGRATED SYSTEM FOR BITUMEN PARTIAL UPGRADING

BACKGROUND OF THE INVENTION

Field of the Invention

The present invention relates to decreasing the amount of diluent needed to convert a heavy oil to a bitumen product that can be transported by pipeline. More specifically, the invention relates to a method and apparatus for partially upgrading heavy oil into a lower viscosity bitumen product. The invention provides a method to produce superheated steam at 1000-2200° C. at high velocity and use it to entrain and atomize heavy oil, where the high temperatures initiate oil upgrading reactions that crack heavier hydrocarbons to lighter ones reducing the amount of diluent needed to transport the oil in a pipeline and increasing its value.

Description of Related Art

Canadian oil sands bitumen produced with the Steam Assisted Gravity Drainage (SAGD) method is a heavy high viscosity product. The heavy oil is typically blended with a diluent at the production site to reduce its viscosity and make it amenable to pipeline transport. Diluent can be from naphtha, natural gas liquids (NGL) or upgraded bitumen (synbit). Naphtha and NGL are the preferred options because it takes lower amounts of these diluents (about 30%) than synbit (about 50%). However, this need for diluent adds a $10-15/bbl cost for the bitumen producer.

Heavy oil, also referred to as bitumen, typically has an American Petroleum Institute (API) gravity in the range of 8°-12°, and is immobile at ambient temperatures. This bitumen is produced from oil formations by two methods a) surface mining and b) in-situ thermal production (i.e., SAGD). The produced oil is either upgraded to a bottomless synthetic crude oil (SCO) or blended with light diluent for transport in conventional pipelines. Most heavy oil upgrading processes aim to upgrade the oil to a final sellable product and are very capital intensive. The process for upgrading bitumen typically includes carbon rejection technologies such as coking or visbraking followed by hydrotreating of the cracked product to convert unsaturated hydrocarbons to saturated ones. Many variations of this basic process design have been proposed. Fluid coking, flexicoking and hydrocracking have also been proposed for upgrading projects.

Upgrading is usually associated with mined bitumen projects in Canadian tar-sands oil recovery. SAGD bitumen which is lighter is typically not field upgraded but is instead blended with a light diluent for pipeline transport to refineries for processing. The blended bitumen and diluent oil is referred as dilbit. Dilbit needs to have a viscosity of 350 cSt and a density of 940 kg/m$^3$ to meet typical pipeline transport requirements. The diluent presents an operating cost to the SAGD producers as its value is not recovered completely. Partial upgrading reduces bitumen viscosity and density to meet pipeline specification thus reducing or eliminating the need for diluent which will reduce operating cost and increase pipeline capacity. This type of upgrading for diluent reduction minimizes carbon rejection and gas formation aiming instead to preserve the oil volume. In the literature the terms "upgrading" and "partial upgrading" are used interchangeably but as utilized herein, the term "partial upgrading" is employed to describe processes that do not include significant carbon rejection in the form of coke but aim instead to reduce the diluent needed for transporting bitumen to market.

Several partial upgrading for diluent reduction technologies have been proposed in the literature. For instance, U.S. Pat. No. 6,852,215 B2 to Wen et al describes a partial upgrading process where the heavy oil is contacted by a hot syngas consisting primarily of $H_2$, CO and $N_2$. The syngas is produced preferably by the partial oxidation of natural gas and air but other fuels can be used as well. The syngas temperature is 650-1650° C. The heat from the syngas production is used to vaporize a portion of the heavy oil which allows upgrading reactions to proceed. The hydrogen in the syngas reacts with upgraded oil to minimize formation of unsaturated hydrocarbons. Further evaporation of unupgraded oil quenches the upgrading reactions and prevents generation of unwanted waste materials.

U.S. Pat. No. 6,989,091 B2 to Jorgensen describes an upgrading process where a heavy oil, preheated to just below the temperature where upgrading reactions start, is contacted with a hot gas jet to initiate upgrading reactions and the resulting load is injected into a non-catalytic reactor that is at a higher temperature (430-480° C.) than the initial oil temperature. The gas is preferably steam at a temperature of 600 to 800° C.

U.S. Pat. No. 7,947,165 B2 to Berkowitz et al discloses the use of supercritical water as a means to upgrade heavy oil. The process requires very high pressures (34-135 bar) at operating temperatures of 250-450° C. It also describes residence times up to 1 minute. These conditions lead to decreases in saturated hydrocarbon content and increases in aromatic content which degrade the quality and value of the oil.

U.S. Pat. No. 7,229,483 B2 to Lewis describes a gasification method based on an ultra-superheated steam. The formation of superheated steam is accomplished with a burner operating with a fuel like natural gas and a mixture of steam and oxygen. The stoichiometric ratio of fuel to oxygen is near the required ratio for complete combustion of fuel and oxygen to carbon dioxide and water. The mixture of steam and oxygen is referred to as artificial air as it has an oxygen concentration similar to that of atmospheric air. This method has some drawbacks as the need to premix and preheat oxygen and steam and the low oxygen concentration in steam which increases the length and dimensions of the combustion chamber compared to oxyfuel combustion.

In addition, certain type of thermal nozzles, have been described in the related art, primarily directed to combustion applications rather than oil upgrading. For instance, U.S. Pat. No. 5,266,024 to Anderson described a method for providing an oxidant employing a thermal nozzle to convert thermal energy to kinetic energy. The method describes the production of a high velocity and high temperature oxygen stream that can be used to supply an oxidant to a combustion zone. The method applies to combustion applications.

U.S. Pat. No. 6,450,108 B1 to Bool III, et al describes a device that is employed to combust a difficult to combust liquid by using the high velocity oxidant jet to atomize the liquid and improve the contact of the fuel contained in the liquid and oxygen to provide a high temperature environment that ignites and sustains combustion of the liquid.

U.S. Pat. No. 6,565,010 B2 to Anderson et al describes an efficient liquid atomizer using a hot gas accelerated to high velocity. The particular invention demonstrates how by using this atomizer very small droplets can be produced even with very viscous fluids.

The related art discussed above does not address the need to decrease the amount of diluent required to convert heavy oil, such as SAGD bitumen, to a product that can be transported by pipeline. An object of the current invention is to minimize the diluent usage and production of low value by-products such as gas and coke. Another object of the invention is to provide a thermally integrated method and apparatus for partially upgrading a heavy oil in the form of a hydrocarbon emulsion or dilbit where superheated steam at 1000-2000° C. and high velocity is utilized to entrain and atomize the heavy oil.

One of the advantages associated with the present invention is the high temperature initiates oil upgrading reactions by cracking heavier hydrocarbons to lighter ones.

Other objects and aspects of the present invention will become apparent to one of ordinary skill in the art upon review of the specification, drawings and claims appended hereto.

SUMMARY OF THE INVENTION

According to one aspect of the invention, an integrated system for partially upgrading a hydrocarbon containing heavy oil into a hydrocarbon product is provided. The system includes: (a) an oxyfuel combustion process carried out in a thermal nozzle producing a hot gas that atomizes a hydrocarbon containing heavy oil and induces upgrading reactions to produce a reactor effluent containing a partially upgraded oil; (b) cooling the reactor effluent; and (c) separating the reactor effluent into a substantially water free partially upgraded hydrocarbon oil product, a water liquid fraction and a gas fraction.

In another aspect of the invention, an integrated system for partially upgrading a hydrocarbon containing heavy oil into a hydrocarbon product is provided. The system includes: (a) a reactor with a thermal nozzle operating an oxyfuel combustion process producing a hot gas that atomizes a hydrocarbon containing heavy oil and induces upgrading reactions to produce a reactor effluent containing a partially upgraded oil; (b) a heat recovery/process boiler for receiving and cooling the partially upgraded reactor effluent producing steam; (c) a flash drum for receiving and separating the reactor effluent into a lighter hydrocarbon and cracked combustion gases portion which is removed overhead from the top of the flash drum, and a flash drum bottom portion of heavier oil hydrocarbons; (d) at least one heat exchanger to cool the product from the top portion of the flush drum; (e) a treater to receive the cooled flash drum portion and separate it into a gas fraction, a water fraction and a light hydrocarbon liquid fraction and (f) combining the flash drum bottom portion from step (c) with the light hydrocarbon liquid fraction from step (e) to form a partially upgraded oil product.

In yet another aspect of the invention, an integrated system for partially upgrading a hydrocarbon containing heavy oil into a hydrocarbon product is provided. The system includes: (a) a free water knock out drum receiving a hydrocarbon containing heavy oil and removing substantially all the freely associated water therefrom; (b) one or more oil treaters receiving the effluent from the free water knock out drum wherein the remainder of the water is removed; (c) a reactor with a thermal nozzle operating an oxyfuel combustion process for receiving and atomizing the hydrocarbon effluent from the oil treater into a partially upgraded reactor effluent; (d) a process boiler for receiving and cooling the partially upgraded reactor effluent; (e) a flash drum for receiving the partially upgraded reactor effluent from step (d) and separating the partially upgraded reactor effluent into a lighter hydrocarbon and cracked combustion gases which are removed overhead from a top portion of the flash drum, and a flash drum bottom portion of a partially upgraded hydrocarbon; and (f) combining the flash drum bottom portion from step (c) with the light hydrocarbon liquid fraction from step (e) to form a partially upgraded oil product.

In a further embodiment of the invention, an integrated system for partially upgrading dilbit is provided. The system includes: (a) heating dilbit to about 200 C to evaporate diluent and produce a partially evaporated dilbit stream (b) a first flash drum to separate the partially evaporated dilbit stream into a light hydrocarbon diluent fraction that is removed from the top and a heavy hydrocarbon fraction that is removed from the bottom (c) a reactor with a thermal nozzle operating an oxyfuel combustion process for receiving and atomizing the hydrocarbon effluent from the flash drum bottom into a partially upgraded reactor effluent; (d) a process boiler for receiving and cooling the partially upgraded reactor effluent; (e) a second flash drum for receiving the partially upgraded reactor effluent from step (d) and separating the partially upgraded reactor effluent into a lighter hydrocarbon and cracked combustion gases which are removed overhead from a top portion of the flash drum, and a flash drum bottom portion of a partially upgraded hydrocarbon; (f) at least one heat exchanger to cool the product from the top portion of the second flush drum; (g) a treater to receive the cooled flash drum portion and separate it into a gas fraction, a water fraction and a light hydrocarbon liquid fraction and (h) combining the flash drum bottom portion from step (e) with the light hydrocarbon liquid fraction from step (g) to form a partially upgraded oil product.

BRIEF DESCRIPTION OF THE FIGURES

The objects and advantages of the invention will be better understood from the following detailed description of the preferred embodiments thereof in connection with the accompanying figures wherein like numbers denote same features throughout and wherein.

DETAILED DESCRIPTION OF THE INVENTION

The present invention provides an integrated process and apparatus for partially upgrading (i.e., lowering the viscosity) of a heavy oil recovered from tar sands, while reducing the amount of diluent necessary. The heavy oil, as utilized herein, is a bitumen product, and it is supplied to the integrated apparatus for processing heavy oil containing either small amounts of water and diluent or as a dilbit. Dilbit as referred to herein has a composition by volume of about 50-70% bitumen and 50-30% diluent.

Heavy oils such as the Canadian oil sands/bitumen are immobile in their natural state. In a steam assisted gravity draining (SAGD) process, or the like, the oil containing formation is heated by pumping steam to the formation to heat the oil and its viscosity is reduced. The oil can be recovered from a well that is positioned below the steam well or from the same well that supplies the steam by alternating steam supply with oil production (i.e., method known as "huff and puff"). The oil comes back to the surface as an emulsion with water. Typically a 3/1 water to oil ratio can on average be expected in the emulsion. The hot emulsion from the well-pads produced from the SAGD process consists of two phases: vapor, and an oil-water emulsion. This needs to be separated into a gas phase for recovery, an oil phase for transport, and a water phase for treatment. Therefore, the SAGD oil recovery process includes the following basic steps:

the bitumen emulsion undergoes a water separation process to meet the pipeline specification of 0.5% basic sediments and water;

the separated produced water is de-oiled and then treated to remove scaling minerals and dissolved oxygen that will allow for its reuse in steam generation; and the gas that is separated from the emulsion at the well-pads and at the plant that is compressed and sent for sulfur recovery and, in some cases, is also used as a supplemental fuel source for the steam generators.

Figure 1:
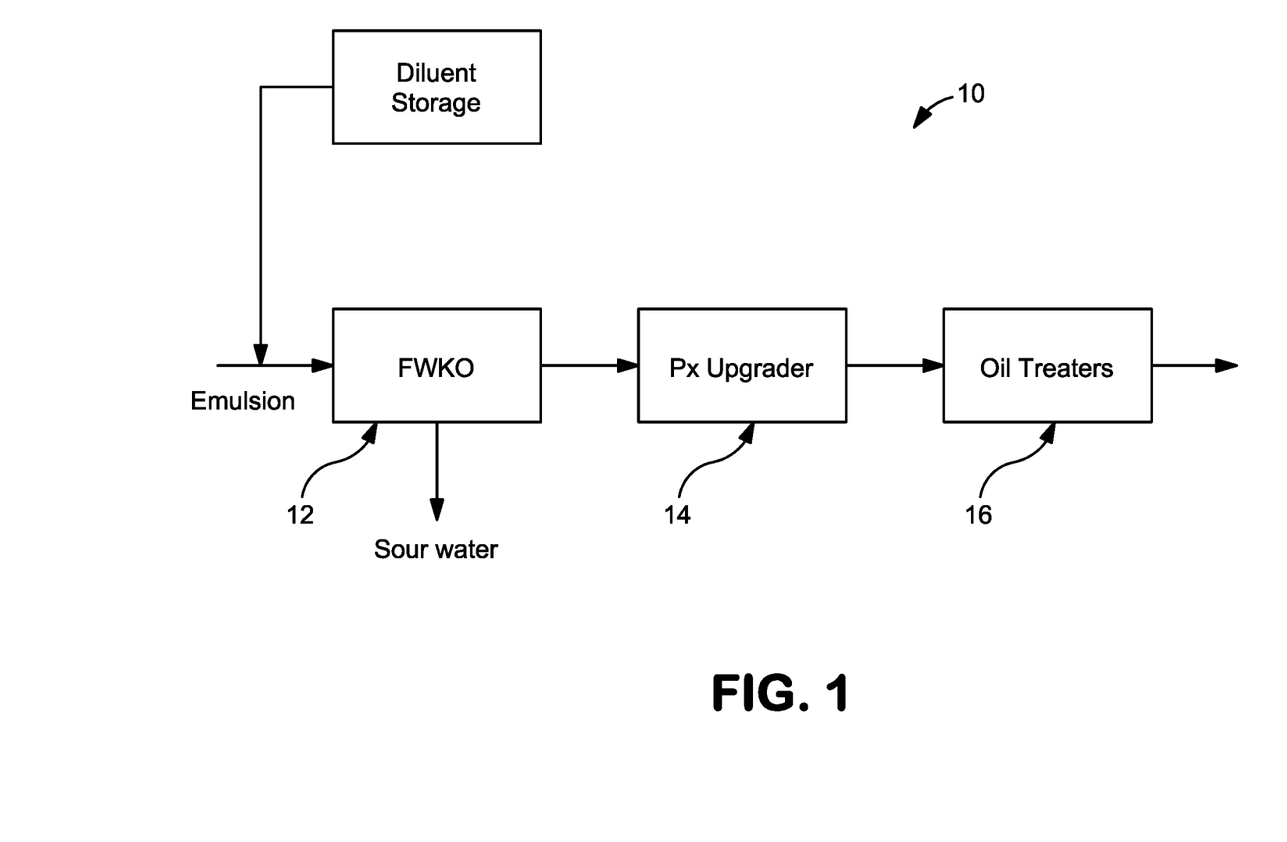
FIG. 1 is a graphical representation of an integrated apparatus for partially upgrading a heavy oil, such as bitumen.

With reference to FIG. 1, an exemplary embodiment of an integrated apparatus (10) for partially upgrading (i.e., lower viscosity) of a heavy oil, such as bitumen, is presented. The emulsion from the well pads is sent to the inlet degasser (not shown) and then it is cooled in the emulsion exchangers (not shown) and mixed with diluent (about 10:1 parts bitumen to diluent) provided from a storage/mixer vessel (18). After emulsion is cooled, it is sent to a free water knockout (FWKO) vessel (12). This FWKO is configured as a long, horizontal vessel (12) that separates free water from degassed crude oil and crude oil-water emulsions, due to the differences in the densities of these mediums. Diluent is added upstream of the FWKO vessel to reduce the bitumen density and facilitate the separation from water. As the liquid enters the vessel the design residence time allows a large portion of the water to separate from the crude, collecting in the lower portion of the vessel. The captured water is pumped away for de-oiling and recycling.

The effluent from the FWKO vessel (12) is routed to the partial upgrading apparatus of the present invention, where the heavy oil is at least partially upgraded. In this upgrading portion of the apparatus which includes a thermal nozzle dedicated to an upgrading reactor (not shown), the oil or hydrocarbon emulsion is atomized forming small droplets that are exposed to a high temperature environment. The small droplets in the hot gas are heated to high temperatures very quickly and vaporize at least partly. The oil vapor enters the high temperature gas phase and initiates oil upgrading reactions by cracking heavier hydrocarbons to lighter ones. The hot steam also contains free radicals that can interact chemically with the oil and also contribute to oil upgrading reactions. Finally shear stresses introduced by the high velocity jet may also contribute to upgrading reactions. The upgrading reactions are temperature dependent and the small oil droplets further evaporate due to heat transfer from the hot gas which helps to control the reactor temperature. The evaporation eventually causes the temperature to drop below the temperature necessary for upgrading reactions. This aids to minimize the formation of unwanted products like coke and gas. By controlling the steam temperature and the steam to oil ratio the extent of upgrading can be controlled. It is desirable to limit the upgrading so that the diluent needed for final pipeline transport is reduced by 5-70%. The upgrading can increase the oil API gravity which increases the value of the oil as lighter oils have a higher price in the marketplace because they require less intensive refining operation to extract marketable fuels from them.

The partially upgraded oil/water emulsion is then routed back to the oil treaters (16) that are used to separate the majority of the remaining water from the oil. The oil from the treaters (16) is cooled in a series of exchangers designed to cool the oil in order to minimize diluent flashing in the sales oil tanks. Higher temperatures can increase the amount of diluent lost to the fuel gas system. The oil product leaving the treaters is stored in the oil tanks from which the product is sold into the marketplace.

The partial upgrading apparatus of the present invention is integrated into the bitumen extraction process in multiple ways. In the exemplary embodiment of FIG. 1, the partial upgrader (14) is inserted downstream of the FWKO vessel (12), and upstream of the oil treater (16). Alternatively the partial upgrader can be inserted downstream of the oil treater.

Figure 2:
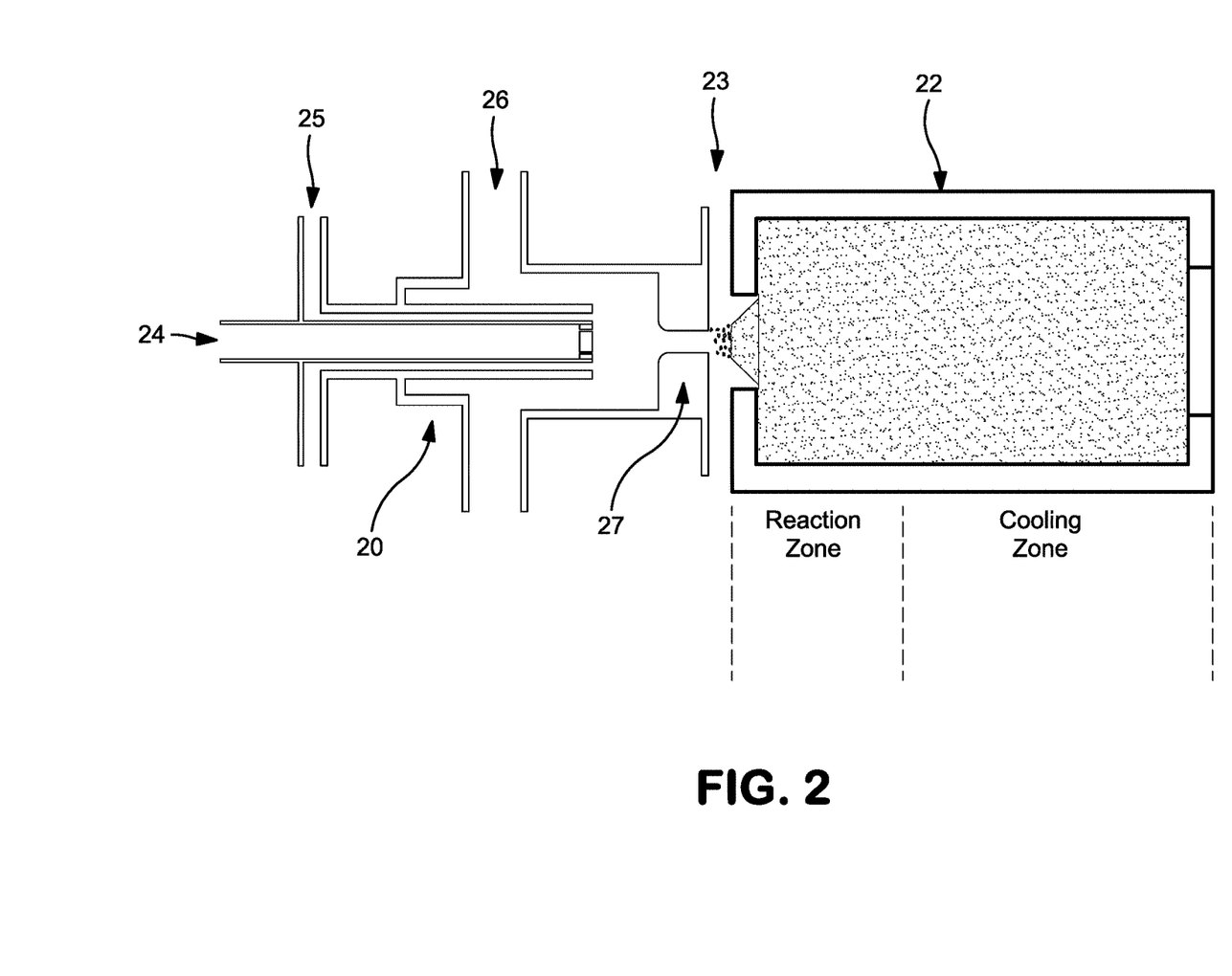
FIGS. 2 and 2A is a schematic illustrating the reactor portion of the integrated system and a detailed illustration of the reactor in the integrated apparatus.

With reference to FIG. 2, the reactor portion of the integrated system is explained. The oil/hydrocarbon emulsion, which may, for example, contain about 10% diluent and about 10% by volume water, is routed from the FWKO vessel (shown in FIG. 1) to a reactor through a thermal nozzle operating as an oxyfuel combustion process. More specifically, the reactor has a hot gas injector (20) and a contact vessel (22) where a viscous liquid is atomized by the hot gas. The hot gas injector is in fluid communication with the contacting vessel. The oil is introduced in the contact vessel from nozzle (27) separately from the hot gas but very close to where the hot gas enters the contacting vessel. The hot gas is formed by introducing fuel, oxygen and steam from flow paths (24), (25) and (26), respectively. The fuel and oxygen ratio is close to stoichiometric to ensure complete oxygen combustion. The fuel and oxygen combust and the combustion products are mixed with the steam forming the hot gas that exits the injector (20) from nozzle (27). The contact vessel has two zones. In the first zone the hot gas atomizes a viscous liquid like heavy oil which is heated quickly to a temperature well above that necessary to initiate upgrading reactions. Through atomization, small droplets of liquid are formed, which are entrained in the hot gas stream and at least partially evaporate. The oil droplets retain a lower temperature of the hot gas that is limited by the boiling temperature of the evaporating oil. It is expected the lower boiling point hydrocarbons will evaporate first. It is more beneficial that the oil contains low amounts of diluent and water as those components will evaporate first consuming heat and reducing the heat available for upgrading reactions. The oil vapor entering the hot gas is exposed immediately to temperatures, shear forces and free radicals that facilitate upgrading reactions. In the second zone further oil droplet evaporation lowers the temperature and reduces the rate of formation of cracked products. The short residence time in the first zone and the quick cooling in the second zone reduce the amount of coke and gas that is produced. The two zones are part of the same vessel and it is difficult to distinguish them but the residence time in the first zone is preferable under 30 sec and more preferable under 5 sec and the residence time in the second zone is preferable under 1 minute and more preferably less than 30 sec. The temperature at the reactor exit is preferable below 540° C. and more preferably below 482° C. The reactor exit temperature will be also determined by the desired degree of upgrading. Higher temperatures will result in a higher degree of upgrading. Reactor exit temperatures in excess of 540° C. will lead to rapid coke formation and are undesirable. The reactor exit temperature is controlled by the ratio of the hot gas to the oil and the initial temperature of the hot gas and the oil. Adjusting the hot gas temperature the oil temperature and the hot gas to oil ratio to achieve the desirable reactor exit temperature also determines the degree of upgrading. Since the oil quality is not the same it can be easily understood by those skilled in the art that the degree of upgrading will be adjusted according to the initial oil quality.

The hot gas can be produced in a variety of ways including heat exchange, resistance heating and by a combustion process. The hot gas can be steam, nitrogen, carbon dioxide, methane, syngas, or other suitable gas or mixture of gases. The hot gas is produced preferably by a combustion process where oxygen is combusted with a fuel at a ratio close to stoichiometric for complete combustion. The preferred fuel is natural gas but other gaseous or liquid fuels can be used as well including bitumen and fuel gas by-product from the upgrading process. The ratio of the hot gas to the combustion gases determines the temperature of the hot gas. High temperatures are desirable for three reasons. First, the hot gas is expanded through a converging/diverging thermal nozzle (27) and higher gas temperatures result in higher velocities which in turn result in smaller droplets as explained in U.S. Pat. No. 6,565,019 B2, which is incorporated herein by reference. Second higher temperatures reduce the ratio of gas to oil necessary to bring the oil to upgrading temperatures quickly. The third reason is that free radical concentrations from steam and combustion products increase as temperature increases and free radicals could play a role in upgrading reactions. Desirable hot gas temperatures are between 1000-2200° C. and more preferable between 1370-1925° C.

An additional design requirement is proper contact of the hot gas with the liquid. This is necessary to ensure that the liquid is entrained in the hot gas and droplets with small and narrow diameter distribution are formed. If that is not the case then the oil will be exposed to uneven conditions and some of it will be overheated while the rest will be under heated. The overheated oil will produce unwanted by-products like gas and coke and the under heated will not produce upgraded products. It is desirable to introduce the oil in close proximity to the hot gas. For example, the hot gas can be introduced around the oil or the oil around the hot gas in a co-flow formation. Alternatively the oil can be introduced at an angle through a nozzle or nozzles surrounding and in close proximity to the hot gas nozzle.

Figure 3:
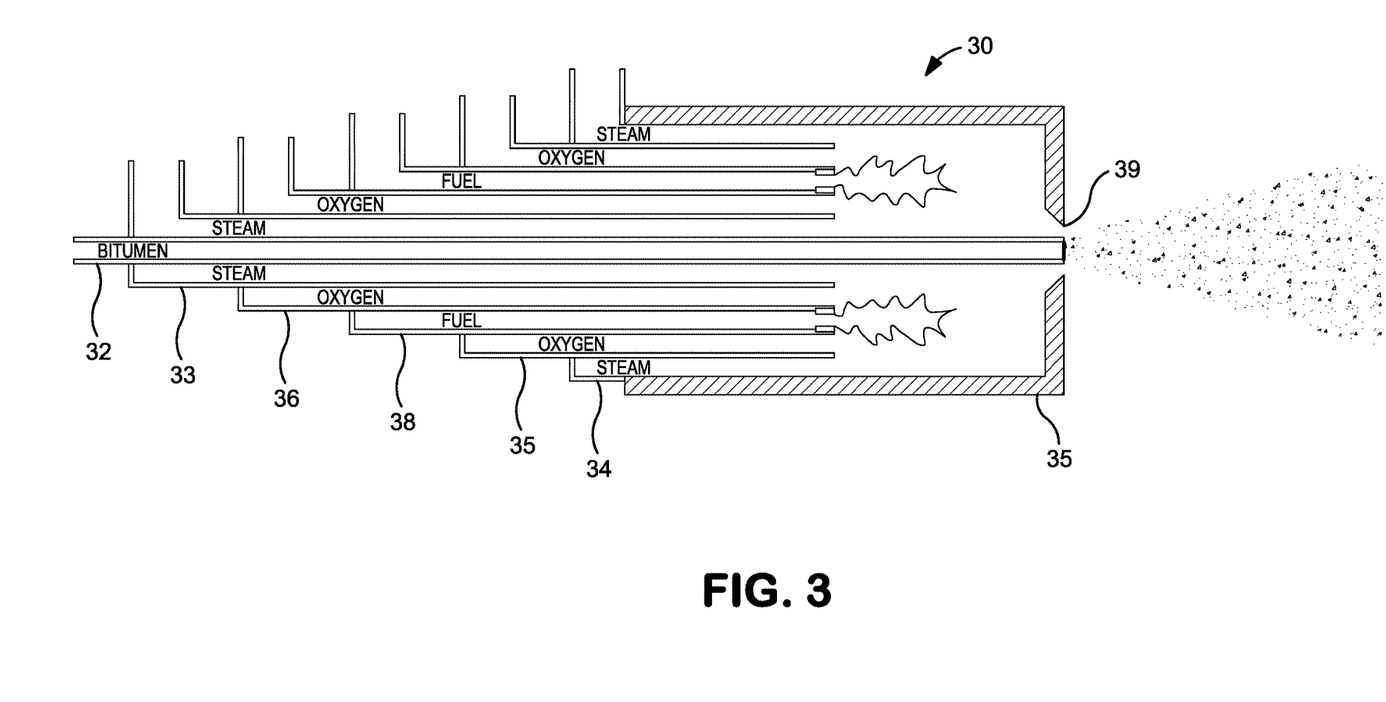
FIG. 3 is a schematic illustration of a thermal nozzle employed in the reaction portion to carry out the oxyfuel combustion process.

As shown in FIG. 3, a thermal nozzle (30) is employed, and the oxyfuel combustion process is explained. Nozzle (30) employs very hot steam to treat the heavy oil/bitumen so that it is partially upgraded to a product with a lower viscosity that is suitable for pipeline transport with low/no diluent addition. The hot steam is produced by the modified thermal nozzle where an oxyfuel combustion process heats the steam to a temperature of 1000-2200° C. The hot steam gas is expanded through a converging diverging nozzle forming a sonic/supersonic superheated turbulent steam jet which immediately comes into contact with the liquid bitumen. The hot jet entrains the bitumen in the form of small liquid droplets. The liquids droplets in the hot stream are heated very quickly and oil evaporates entering the high temperature gas environment. While not wanting to be bound by any particular theory, it is believed that the large hydrocarbon molecules evaporating from the liquid droplets crack to smaller molecules by three possible mechanisms 1) the heat from the hot steam, 2) OH— radicals in the hot steam and 3) the shear forces generated by the hot gas jet. As the cracking occurs at least part of the remaining droplets vaporize which lowers the reactor temperature and in time stop the cracking reactions. The evaporated hydrocarbons are exposed to cracking temperatures for very short time which prevents the formation of coke and gaseous products that decrease the value of the oil. The majority of the asphaltenes and resins contained in the oil may never enter the gas stream and will remain at cooler droplet temperatures for the duration of the time in the reactor which will further minimize coke formation.

In the embodiment of FIG. 3, thermal nozzle (30) is configured with a central conduit which extends through the combustion chamber (35) to the outer perimeter thereof. At least one fuel line is disposed around the central conduit and leading into an inner section of the combustion chamber. As discussed above, the fuels can be any number of hydrocarbon based fuels including, for example, natural gas. At least two oxygen lines (35, 36) are disposed around the fuel line (38) and is coextensive with the fuel line into the combustion chamber (35) where an oxycombustion process takes place. At least two hot gas lines (33, 34) are provided, where a first hot gas line (33) is disposed annularly between an inner most oxygen line (36) and the central conduit (32) and a second hot gas line (34) is disposed between the outer most oxygen line (35) and the combustion chamber (34) thereby forming a buffer protecting the inner central conduit (32) and the combustion chamber (34). A converging/diverging nozzle (39) located at the distal end of the combustion chamber (35) is utilized for contacting and atomizing the hydrocarbon emulsion or dilbit.

Figure 4:
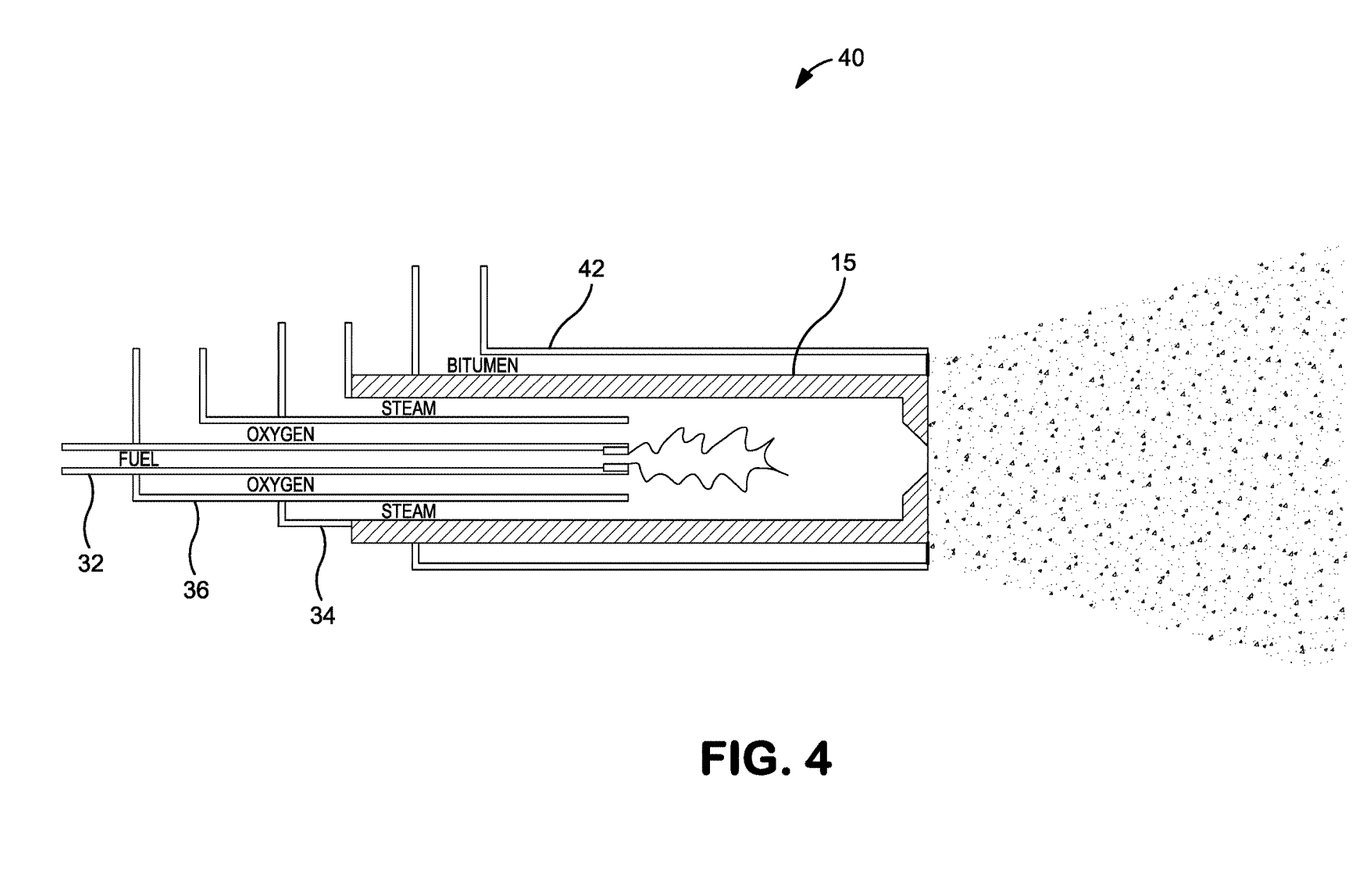
FIG. 4 is a schematic illustration of another exemplary embodiment of the thermal nozzle that may be employed in the integrated system of the present invention.

Turning to FIG. 4, another exemplary embodiment of the thermal nozzle (40) that may be employed in the integrated system of the present invention is shown. Like the embodiment of FIG. 3, the nozzle includes a combustion chamber (35) wherein an oxycombustion process is carried out forming a hot gas mixture. The combustion chamber includes a central conduit (32) for introducing a fuel into the combustion chamber (35). An oxygen line (36) is annularly disposed around and coextensive in length with the central conduit (32) into the interior of the combustion chamber. A hot gas line (34) is annularly disposed around the oxygen line (36) and coextensive in length therewith. A conduit or sleeve (42) is disposed on the periphery of the combustion chamber (35) to introduce heavy oil/bitumen which is contacted with the hot gas mixture formed in the combustion chamber (35) and the heavy oil/bitumen is atomized.

Figure 5:
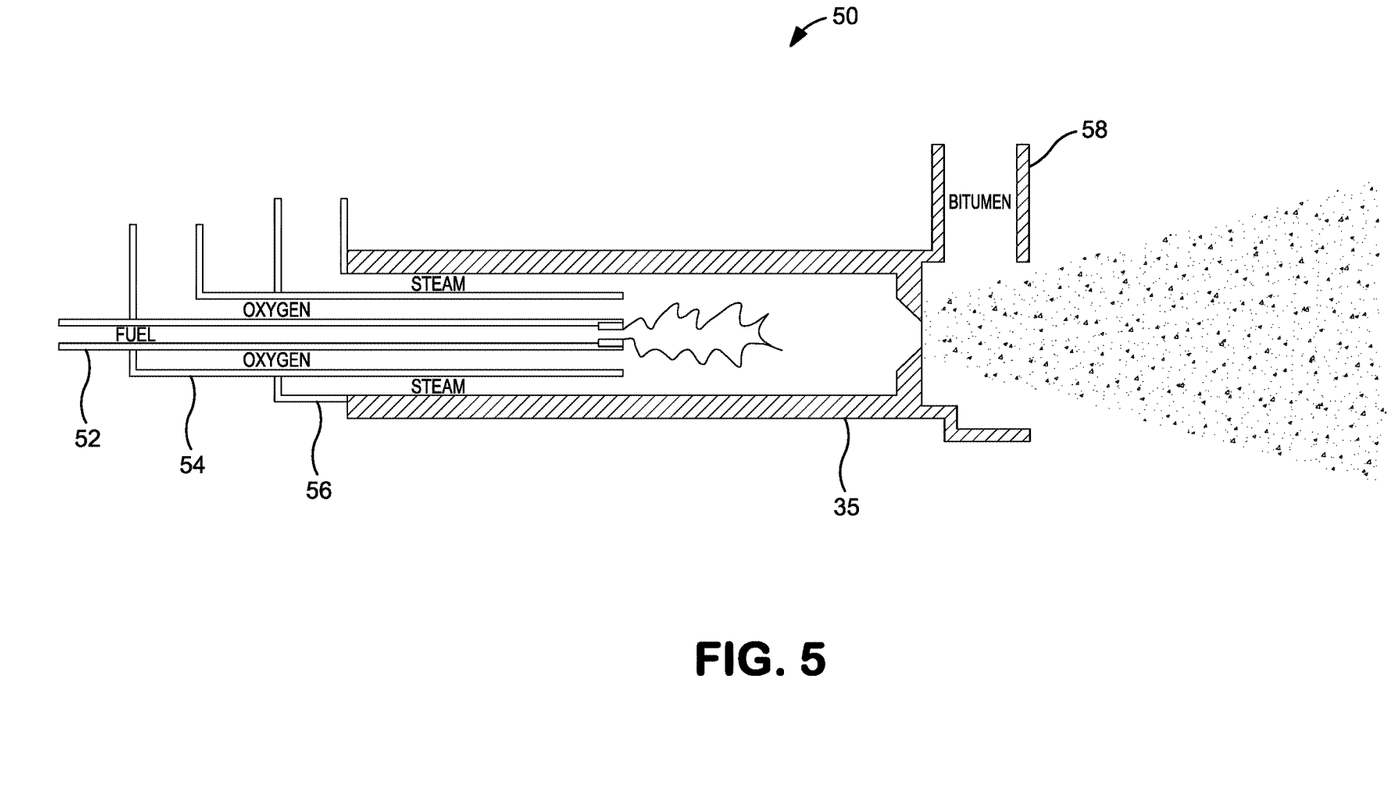
FIG. 5 is a graphical representation of yet another exemplary embodiment of a thermal nozzle having a different configuration.

FIG. 5 depicts yet another exemplary embodiment of a thermal nozzle (50) having a different configuration. A combustion chamber (35) is provided where an oxycombustion process takes place forming a hot oxygen gas mixture. A central conduit (52) introduces a fuel, and an oxygen line (54) disposed around the fuel line coextensively into an inner section of the combustion chamber (35). A hot gas line (56) is disposed around the oxygen line (54) and it is likewise coextensive with oxygen line (54) into the combustion chamber (35). As the combustion takes place the expanding hot gas exits through a convergent/divergent nozzle disposed at the distal end of the combustion chamber at a predetermined velocity. One or more conduits (58) is employed to route the heavy oil to the divergent section portion of the nozzle, which is located at the outlet of the combustion chamber. The heavy oil is contacted with the hot expanding gas and it entrains and atomizes the heavy oil.

With reference back to FIG. 2A, the reactor having a hot gas injector and a contact vessel where a viscous liquid is atomized by the hot gas. The contact vessel has two zones. In the first zone the hot gas atomizes a viscous liquid like heavy oil which is heated quickly to a temperature well above that necessary to initiate upgrading reactions. In the second zone oil droplet evaporation lowers the temperature and reduces the rate of formation of cracked products. The short residence time in the first zone and the quick cooling in the second zone reduce the amount of coke and gas that is produced. The reactor product which consists primarily of light hydrocarbons (e.g., reduced viscosity bitumen, some diluent, carbon dioxide, and steam) is further cooled in a heat exchanger (64) in communication with the reactor to stop upgrading reactions and recover heat.

Figure 2A:
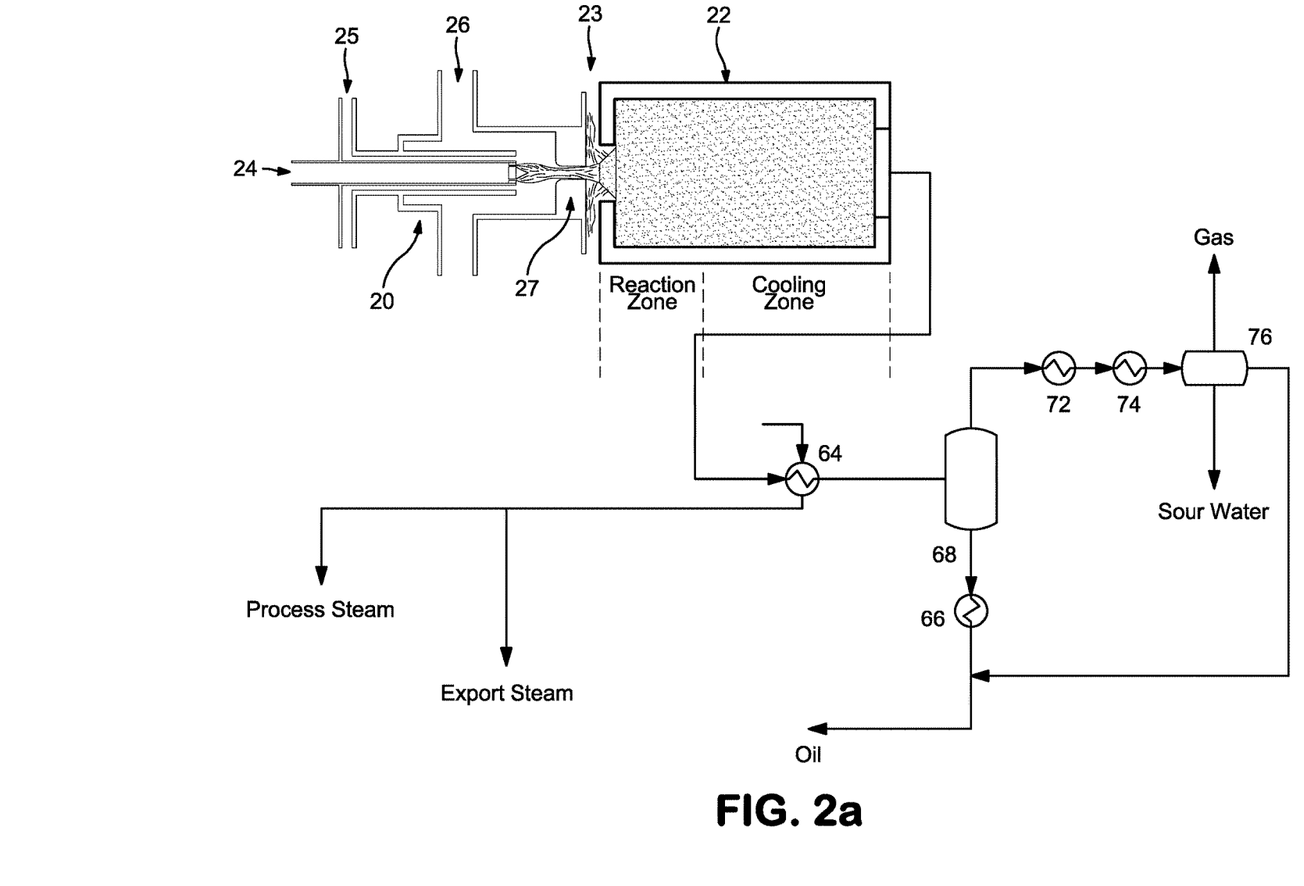

The reactor effluent is first cooled to 160° C. in a heat exchanger (64) (i.e., process boiler) generating steam. The produced steam can be used in the process and any excess can be exported for use at the SAGD facility. The cooled reactor effluent is routed to a knock out flash drum (68) that separated the stream in a liquid phase that contains primarily heavier hydrocarbons bottom portion and a gas phase that contains lighter hydrocarbons, water vapor and combustion gases overhead portion. The stream of heavier liquid hydrocarbons 60 is cooled in a glycol exchanger (66) to 38° C. The gas stream 61 from the flash drum (68) is further cooled in a first glycol cooled heat exchanger (72) to 48° C. and further cooled in a second propane cooled heat exchanger (74) to 5° C. and then send to a three way separator (76) which produces a gas stream 62, a liquid light hydrocarbon stream 63 and a sour water stream 64. The light hydrocarbon stream 63 is blended with the separated heavier hydrocarbon stream 65 from glycol exchanger (66). The overhead gases 66 from three way separator (76) can be sent to a fuel header or to an incinerator. The sour water stream 64 from three way separator (76) is sent to the SAGD water treatment facilities. The oil 67 that is produced by mixing the hydrocarbons 65 and 63 from glycol exchanger (66) and three way separator (76) can be returned to the existing SAGD process into oil treater (16), shown in FIG. 1.

Alternatively the reactor effluent can be cooled by other means like oil injection, diluent injection, water injection or gas injection into the hot reactor effluent. Injecting cooled processed oil is preferred. The cooled reactor effluent can then be separate into the upgraded oil fraction, sour water fraction and a gas fraction with conventional separation facilities such as a three way separator vessel. The substantially water free upgraded oil can be sent back to the treater facilities or to storage. The sour water can be sent to a sour water treatment facility for water recovery and reuse and the gas can be sent to an incinerator or used as fuel in the steam generation facility of the heavy oil production facility.

In another embodiment of the present integrated system dilbit from storage facilities can be treated with reactor (22). The dilbit may contain 10-30% diluent which must be removed before the reactor. In this case the dilbit is first heated in a heat exchanger to a temperature of about 200° C. which is sufficient to evaporate most of the diluent and then sent to a separator vessel to separate the gaseous diluent from the heavy hydrocarbon liquid. The balance of the process is carried out in the manner described with reference to FIG. 2A. The gaseous diluent is cooled, condensed and sent back to storage.

The methods described herein can also be applied to upgrade bottom of the barrel heavy oil in conventional refineries. Such heavy oil is usually from the atmospheric or vacuum distillation tower bottoms.

The invention is further explained through the following Examples, which are based on various embodiments of the system, but are in no way to be construed as limiting the present invention.

EXAMPLE 1

In the embodiment of the reactor in FIG. 3 about 45 g/min of bitumen having a viscosity of 1752 cSt at 70° C. were send to the reactor. The bitumen was treated with about 45 gr/min of hot steam that was heated by combusting 10 liter/min oxygen with 36 liter/min hydrogen. The reactor operated for four hours. The bitumen from the reactor was cooled and separated from water and gas. The processed bitumen has a viscosity of 670 cSt at 70° C. The reactor operated at an average temperature of 396° C. From the viscosity reduction it was estimated that 16% less diluent would be required for the processed bitumen than the feed bitumen to reduce the viscosity to 350 cSt at 20° C.

EXAMPLE 2

In the embodiment of the reactor in FIG. 3 about 60 gr/min of bitumen having a viscosity of 1690 cSt at 70° C. were send to the reactor. The bitumen was treated with about 38.5 gr/min of hot steam that was heated by combusting 8.8 liter/min oxygen with 30.8 liter/min hydrogen. The reactor operated for four hours. The bitumen from the reactor was cooled and separated from water and gas. The processed bitumen has a viscosity of 1230 cSt at 70° C. The reactor operated at an average temperature of 341° C. From the viscosity reduction it was estimated that 6% less diluent would be required for the processed bitumen than the feed bitumen to reduce the viscosity to 350 cSt at 20° C.

While the invention has been described in detail with reference to specific embodiments thereof, it will become apparent to one skilled in the art that various changes and modifications can be made, and equivalents employed, without departing from the scope of the appended claims.

What is claimed is:

1. An integrated system for partially upgrading a hydrocarbon containing heavy oil into a hydrocarbon product, comprises:
(a) an oxyfuel combustion process carried out in a thermal nozzle, wherein a fuel and an oxygen are mixed at a ratio close to the stoichiometric to complete the combustion and further introducing steam into the thermal nozzle producing a hot gas that atomizes a hydrocarbon containing heavy oil and induces upgrading reactions to produce a reactor effluent containing a partially upgraded oil;
(b) means for cooling the reactor effluent; and
(c) means for separating the reactor effluent into a substantially water free partially upgraded hydrocarbon oil product, a water liquid fraction and a gas fraction, wherein the thermal nozzle for atomizing a hydrocarbon containing heavy oil or dilbit in an oxycombustion process, comprises:
(i) a central conduit for introducing the hydrocarbon heavy oil or dilbit, wherein the outlet of the central conduit extends to the perimeter of a combustion chamber;
(ii) at least one fuel line annularly disposed around the central conduit and leading into an inner section of the combustion chamber;

(iii) at least one oxygen line annularly disposed around the at least one fuel line and coextensive therewith into the combustion chamber where an oxycombustion process takes place;

(iv) at least two hot gas lines, where a first hot gas line is disposed annularly between an inner most oxygen line and the central conduit and a second hot oxygen line disposed between the outer most oxygen line and the combustion chamber thereby forming a buffer protecting the inner central conduit and the combustion chamber; and (v) a converging/diverging nozzle at the distal end of the combustion chamber where the hydrocarbon containing heavy oil or dilbit exiting the central conduit is contacted by a hot gas mixture and atomizes the hydrocarbon heavy oil or dilbit.

2. An integrated system for partially upgrading a hydrocarbon containing heavy oil into a hydrocarbon product, comprising:

(a) an oxyfuel combustion process carried out in a thermal nozzle, wherein a fuel and an oxygen are mixed at a ratio close to the stoichiometric to complete the combustion and further introducing steam into the thermal nozzle producing a hot gas that atomizes a hydrocarbon containing heavy oil and induces upgrading reactions to produce a reactor effluent containing a partially upgraded oil;

(b) means for cooling the reactor effluent; and (c) means for separating the reactor effluent into a substantially water free partially upgraded hydrocarbon oil product, a water liquid fraction and a gas fraction, wherein the thermal nozzle for atomizing a hydrocarbon containing heavy oil or dilbit in an oxycombustion process, comprising:

(i) a combustion chamber wherein an oxycombustion process takes place forming a hot gas mixture;

(ii) a central conduit for introducing a fuel in the combustion chamber;

(iii) an oxygen line annularly disposed around the fuel line coextensively with the central conduit into the combustion chamber;

(iv) a hot gas line annularly disposed around the oxygen line coextensively with the oxygen line into the combustion chamber;

(v) a conduit or sleeve disposed on the periphery of the combustion chamber for introducing the hydrocarbon containing heavy oil or dilbit; and (vi) a convergent/divergent nozzle at a distal end of the combustion chamber where a hydrocarbon emulsion or dilbit is contacted by the hot gas mixture and atomizes the hydrocarbon containing heavy oil or dilbit.

3. An integrated system for partially upgrading a hydrocarbon containing heavy oil into a hydrocarbon product, comprising:

(a) an oxyfuel combustion process carried out in a thermal nozzle, wherein a fuel and an oxygen are mixed at a ratio close to the stoichiometric to complete the combustion and further introducing steam into the thermal nozzle producing a hot gas that atomizes a hydrocarbon containing heavy oil and induces upgrading reactions to produce a reactor effluent containing a partially upgraded oil;

(b) means for cooling the reactor effluent; and (c) means for separating the reactor effluent into a substantially water free partially upgraded hydrocarbon oil product, a water liquid fraction and a gas fraction, wherein the thermal nozzle for atomizing a hydrocarbon containing heavy oil or dilbit in an oxycombustion process, includes:

(i) a combustion chamber wherein an oxycombustion process takes place forming a hot gas mixture;

(ii) a central conduit for introducing a fuel in the combustion chamber;

(iii) an oxygen line annularly disposed around the fuel line coextensively with the central conduit into the combustion chamber;

(iv) a hot gas line annularly disposed around the oxygen line coextensively with the oxygen line into the combustion chamber;

(v) a convergent/divergent nozzle at a distal end of the combustion chamber where the expanding hot gas mixture exits the combustion chamber at a predetermined velocity; and (vi) one or more conduits introducing hydrocarbon containing heavy oil or dilbit from a side of the convergent/divergent nozzle so as to atomize the hydrocarbon containing heavy oil or dilbit.

* * * * *